US012543656B2

(12) United States Patent
Hamilton et al.

(10) Patent No.: US 12,543,656 B2
(45) Date of Patent: Feb. 10, 2026

(54) RFID SPACING FOR SMALL SQUARE BALE AGGREGATES

(71) Applicant: AGCO Corporation, Duluth, GA (US)

(72) Inventors: Kevin J. Hamilton, Newton, KS (US); Shane A. Bollinger, Hesston, KS (US); Patrick Kendrick, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 343 days.

(21) Appl. No.: 18/257,616

(22) PCT Filed: Oct. 6, 2021

(86) PCT No.: PCT/IB2021/059175
§ 371 (c)(1),
(2) Date: Jun. 15, 2023

(87) PCT Pub. No.: WO2022/130043
PCT Pub. Date: Jun. 23, 2022

(65) Prior Publication Data
US 2024/0040967 A1 Feb. 8, 2024

Related U.S. Application Data

(60) Provisional application No. 63/128,020, filed on Dec. 19, 2020.

(51) Int. Cl.
*A01F 15/14* (2006.01)
*A01F 15/12* (2006.01)
(Continued)

(52) U.S. Cl.
CPC ............. *A01F 15/14* (2013.01); *A01F 15/12* (2013.01); *A01F 15/04* (2013.01); *G06K 19/0723* (2013.01)

(58) Field of Classification Search
CPC .......... A01F 15/14; A01F 15/12; A01F 15/04; G06K 19/0723
See application file for complete search history.

(56) References Cited

U.S. PATENT DOCUMENTS 8,516,954 B2 * 8/2013 Smith ..................... A01F 15/08
100/2
9,622,418 B2 4/2017 Smith et al.
(Continued)

FOREIGN PATENT DOCUMENTS

CA 2787086 A1 * 7/2011 ............. G06Q 10/08

OTHER PUBLICATIONS

English Translation of CA-2787086-A1 (Year: 2011).*
(Continued)

*Primary Examiner* — Claude J Brown

(57) ABSTRACT

A method of storing information corresponding to crop material formed into a bale during a baling process for an aggregation of bales. Crop material is formed into a bale with the baler to obtain a formed bale. At least one parameter of the crop material or formed bale is detected with at least one crop sensor and/or bale sensor for the formed bale. The baler is provided with binding material from the binding material roll comprising identification tags at spaced intervals along the binding material. The formed bale is bound with the binding material using the knotter system such that an identification tag is applied to the bale to obtain a tagged bale. A bale ID is created for the tagged bale and the sensor parameter for the tagged bale is associated with the bale ID. Further crop material is formed into at least one additional bale with the baler to obtain at least one additional formed bale. The at least one additional formed bale is bound with the binding material such that an identification tag is not applied to the at least one additional formed bale to obtain at least one non-tagged bale. The at least one non-tagged
(Continued)

bale is associated with the tagged bale and the tagged and non-tagged bales are formed into a bale aggregate.

1 Claim, 5 Drawing Sheets

(51) Int. Cl.
    *A01F 15/04*     (2006.01)
    *G06K 19/07*     (2006.01)

(56) References Cited

U.S. PATENT DOCUMENTS

| | | | |
|---|---|---|---|
| 2007/0185612 A1* | 8/2007 | Stevens | G06Q 10/087 700/215 |
| 2014/0156541 A1* | 6/2014 | Waite | G01G 21/22 705/308 |
| 2018/0260674 A1 | 9/2018 | Hamilton et al. | |
| 2018/0260675 A1* | 9/2018 | Hamilton | G06K 19/07773 |
| 2018/0295781 A1* | 10/2018 | Hamilton | G09F 3/02 |
| 2019/0124850 A1 | 5/2019 | Okamura et al. | |

OTHER PUBLICATIONS

European Patent Office, International Search Report related to International Patent Application No. PCT/IB2021/059175, mail date Dec. 13, 2021, 11 pages.

\* cited by examiner

RFID SPACING FOR SMALL SQUARE BALE AGGREGATES

BACKGROUND OF THE INVENTION

Field of Invention

The present disclosure is generally related to agricultural balers and, more particularly to a method and assembly for supplying a bale identification tag to an aggregate of agricultural bales.

Description of Related Art

Crop material to be used as animal feed is often cut, dried and formed into bales by balers so that the plant material can be more easily transported, stored and fed to livestock. The bales are formed by moving over crop windrows to collect loose crop material, compress it, and form it into bales that are then bound and ejected. To that end, a baler is typically mechanically coupled with a tractor, and a power take-off (PTO) mechanism transfers power from the tractor's engine to drive the baler's operation. For example, in a square baler, a rotary pick-up at the front of the baler collects the loose crop material and moves it into a feeder chute. Once the feeder chute is full, its contents are moved into a forming chamber. A reciprocating plunger compresses the crop material in the forming chamber into a growing bale. When the bale reaches a predetermined length, which for small square bales could be about three to four feet, it is tied and ejected through a discharge outlet to fall onto the ground behind the baler. The process then continues to create the next bale. Different balers are available that form bales in various sizes and shapes depending on the needs of the operator. Small square balers are used in the agricultural industry to create substantially rectangular bales of crop material that are sized so that they can be handled and stacked by hand and are the choice of many hobby farmers.

Tracking bales using an attached RFID or similar identification device has become desirable in that it allows the operator to track key bale attributes and provide traceability in order to meet customer requirements and existing/future government regulations. However, tracking bales using RFIDs is typically limited to larger bales as the added expense has been cost prohibitive for use on smaller bales. Customers may be willing to pay the additional cost for an identification device for large square and round bales weighing over about 0.5 tons with a value of greater than about $150.00 per bale, but customers usually are not willing to accept the additional cost for a small square bale that weighs only 40-80 lbs. with a value of $4 to $8 dollars.

Therefore, there is a need for an improved ways to aid the tracking and traceability of small square bales.

BRIEF SUMMARY OF THE INVENTION

Briefly stated, one aspect of the invention is directed to a method of storing information corresponding to crop material formed into a bale during a baling process for an aggregation of bales. Crop material is formed into a bale with the baler to obtain a formed bale. At least one parameter of the crop material or formed bale is detected with at least one crop sensor and/or bale sensor for the formed bale. The baler is provided with binding material from the binding material roll comprising identification tags at spaced intervals along the binding material. The formed bale is bound with the binding material using the knotter system such that an identification tag is applied to the bale to obtain a tagged bale. A bale ID is created for the tagged bale and the sensor parameter for the tagged bale is associated with the bale ID. Further crop material is formed into at least one additional bale with the baler to obtain at least one additional formed bale. The at least one additional formed bale is bound with the binding material such that an identification tag is not applied to the at least one additional formed bale to obtain at least one non-tagged bale. The at least one non-tagged bale is associated with the tagged bale and the tagged and non-tagged bales are formed into a bale aggregate.

This summary is provided to introduce concepts in simplified form that are further described below in the Description of Preferred Embodiments. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiment.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

DESCRIPTION OF PREFERRED EMBODIMENTS

Figure 1:
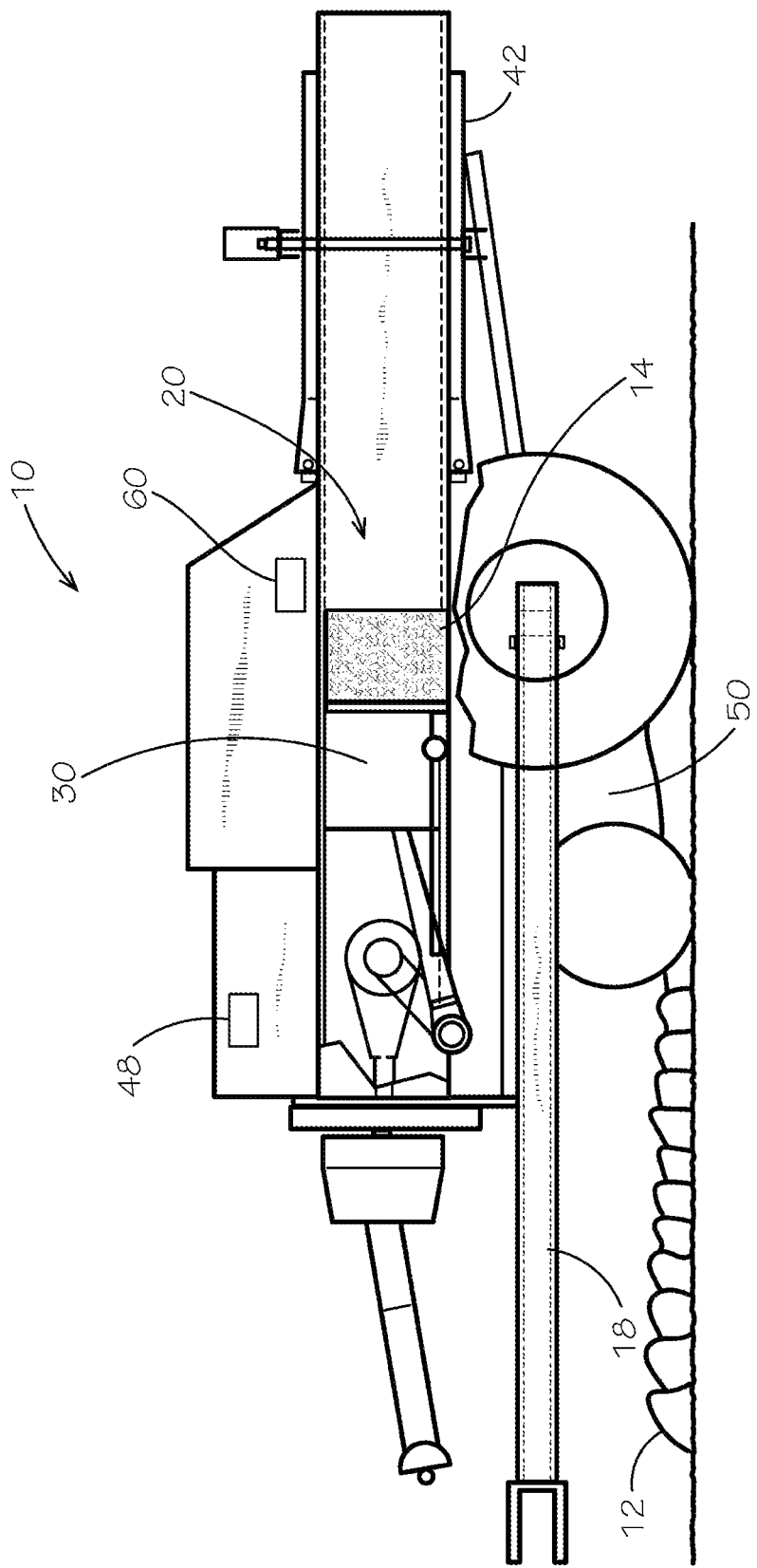
FIG. 1 is a schematic diagram of an baler.

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

Referring now to FIG. 1, shown is a semi-schematic diagram of an agricultural baler 10 which may be employed while baling loose crop material 12 from the ground into bales 14. In the illustrated embodiment, the baler 10 is what is commonly referred to as a small square baler. The baler 10 is hitched to a towing vehicle by a fore-and-aft tongue 18, and power for operating the various mechanisms of the baler 10 may be supplied by the power take off (PTO) of the towing vehicle, though not limited as such. One having ordinary skill in the art should appreciate in the context of the present disclosure that the example baler 10 is merely illustrative, and that other types of baling devices that utilize bale identification assemblies may be implemented.

The baler 10 has a fore-and-aft extending baling chamber denoted generally by the numeral 20 within which bales 14 of crop material 12 are prepared. A pickup assembly broadly denoted by the numeral 30 is positioned under the tongue 18 on the longitudinal axis of the machine, somewhat forwardly of the baling chamber 20. In the particular illustrated embodiment, the baler 10 is an "extrusion" type baler in which the bale discharge orifice at the rear of the baler is generally smaller than upstream portions of the chamber such that the orifice restricts the freedom of movement of a previous charge and provides back pressure against which a reciprocating plunger 30 within the baling chamber 20 can act to compress charges of crop materials into the next bale as would be understood by one skilled in the art.

The plunger 30, as is known, reciprocates within the baling chamber 20 in compression and retraction strokes across the opening at the bottom of the baling chamber 20. The reciprocating plunger 34 presses newly introduced charges of crop material against a previously formed and tied bale 14 to thereby form a new bale. This action also causes both bales to intermittently advance toward a rear discharge opening 14 of the baler.

Figure 2:
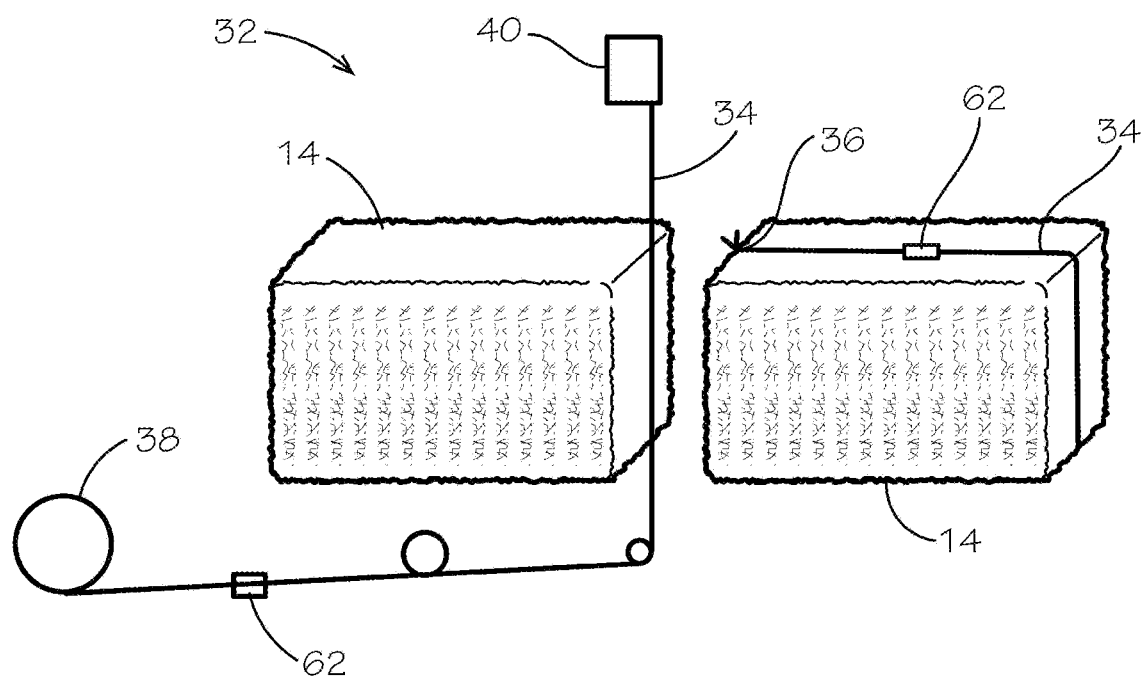
FIG. 2 is a schematic diagram of a bale bound with a binding material having a bale identification tag.

Turning also now to FIG. 2, each completed bale 14 is tied with binding material or a similar twine. A knotter system 32 is configured to loop a binding material 34 around the finished bale 14 and tie a knot 36 in the binding material. The term "binding material" as used herein is intended to mean not only twine made from natural or synthetic fibers, but may also include metallic wire or other strapping material. The knotter system 32 may be implemented as known in the art, and may for example comprise at least one source of binding material, e.g. at least one binding material supply roll 38, and a knotter mechanism 40, for example implemented as a reciprocating inserter arm or bill hook, for bringing another piece, e.g. end, of the binding material towards the end held by the hook mechanism, for securing the binding material to itself so as to make a loop. In one embodiment known as a single a single knotter, a single supply roll 38 may be provided at the side of the knotter system 32. As both single and double knotter systems are well known in the art, further description of the knotter system 32 need not be included herein. Once tied, the bale 14 is discharged from the rear end of the bale-forming chamber 20 onto a discharge in the form of a chute, generally designated 42.

The baler 10 may include one or more computing devices such as electronic control unit (ECU) 48. It will be understood that one or more ECUs 48 may be employed and that ECU 48 may be mounted at various locations on the towing vehicle, baler 10, or elsewhere. ECU 48 may be a hardware, software, or hardware and software computing device, and may be configured to execute various computational and control functionality with respect to baler 10 (or towing vehicle). As such, ECU 48 may be in electronic or other communication with various components and devices of baler 10 (or towing vehicle). For example, the ECU 48 may be in electronic communication with various actuators, sensors, and other devices within (or outside of) baler 10. ECU 48 may communicate with various other components (including other controllers) in various known ways, including wirelessly.

As the baled crop material 12 is formed in the baler 10, certain parameters or qualities of the crop material 12 or bale 14 such as moisture quality, baling time, bale weight, bale length, etc. may be measured or determined by one or more sensors 50 on the baler 10. One skilled in the art will understand how these crop or bale parameters may be measured using known sensors 50 and techniques so further discussion of such sensors or measurement techniques need not be contained herein. Each measurement may be communicated to the ECU 48 for recording. The ECU 48 may communicate the detected measurement to a data server or other database for storage. The measurements may be stored locally via the data server or wirelessly communicated via a mobile device to a remote location over the cloud-based technology.

A bale identification assembly 60 is provided for assigning attributes of the crop material 12 and/or bale 14 to a bale identification tag 62 applied to at least one bale 14. Desirably, the bale identification tag 62 is a passive radio-frequency identification (RFID) tag used to electronically store information and collect energy from a nearby RFID reader's interrogating radio waves. As RFID tags are known to those skilled in the art, a detailed description of the RFID tag need not be provided herein. In embodiments of the present invention, the binding material 34 applied by the knotter system 32 is provided with bale identification tags 62. Bale identification tags 62 may be placed in the binding material 34 at certain intervals so that at least one identification tag 62 is provided for a desired number of bales 14 that are formed and tied by the baler 10.

In one embodiment, instead of storing bale attribute data directly to the bale identification tag 62, the identification tag 62 is assigned to a given bale 14 and attributes of that bale 14 such as weight, variety, location, moisture, feed value, mass flow, flake count, time of day, etc., as measured by the one or more sensors 50 are then associated with the identification tag 62 using software and a task controller post bale drop. The attributes and the bale tag identification number may be stored in a data server or database in an organized format so that it may be retrieved at a later time. For example, a user of a mobile device may access the data wirelessly via Wi-Fi, cloud-based technology or any other known communication means by accessing a server or database where the information is stored. In this manner, the data associated with any bale 14 may be tracked from a remote location at any given time. In one embodiment the bale identification assembly 60 and identification tags 62 are as described in commonly assigned U.S. Pat. No. 10,303, 997 entitled Bale Identification Assembly for Binding and Identification Tag to a Bale of Agricultural Crop Material, which is incorporated herein by reference. However, one skilled in the art will understand that other bale identification tags and methods of associating bale attributes with the bale tag for a given bale may be used without departing from the scope of the invention.

Figure 3:
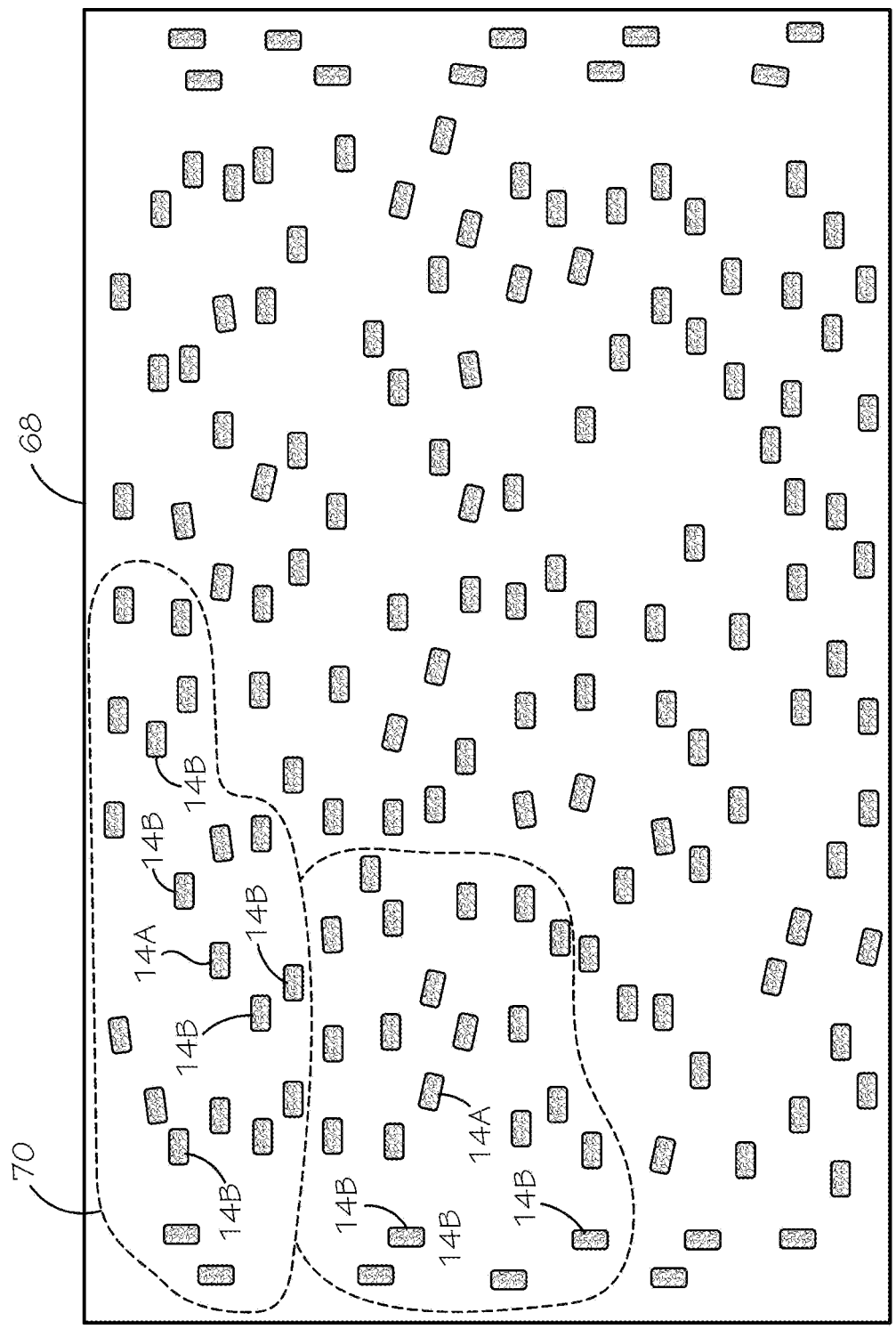
FIG. 3 is a plan view of a plurality of bales of agricultural product placed on the ground surface of a field.
Figure 4:
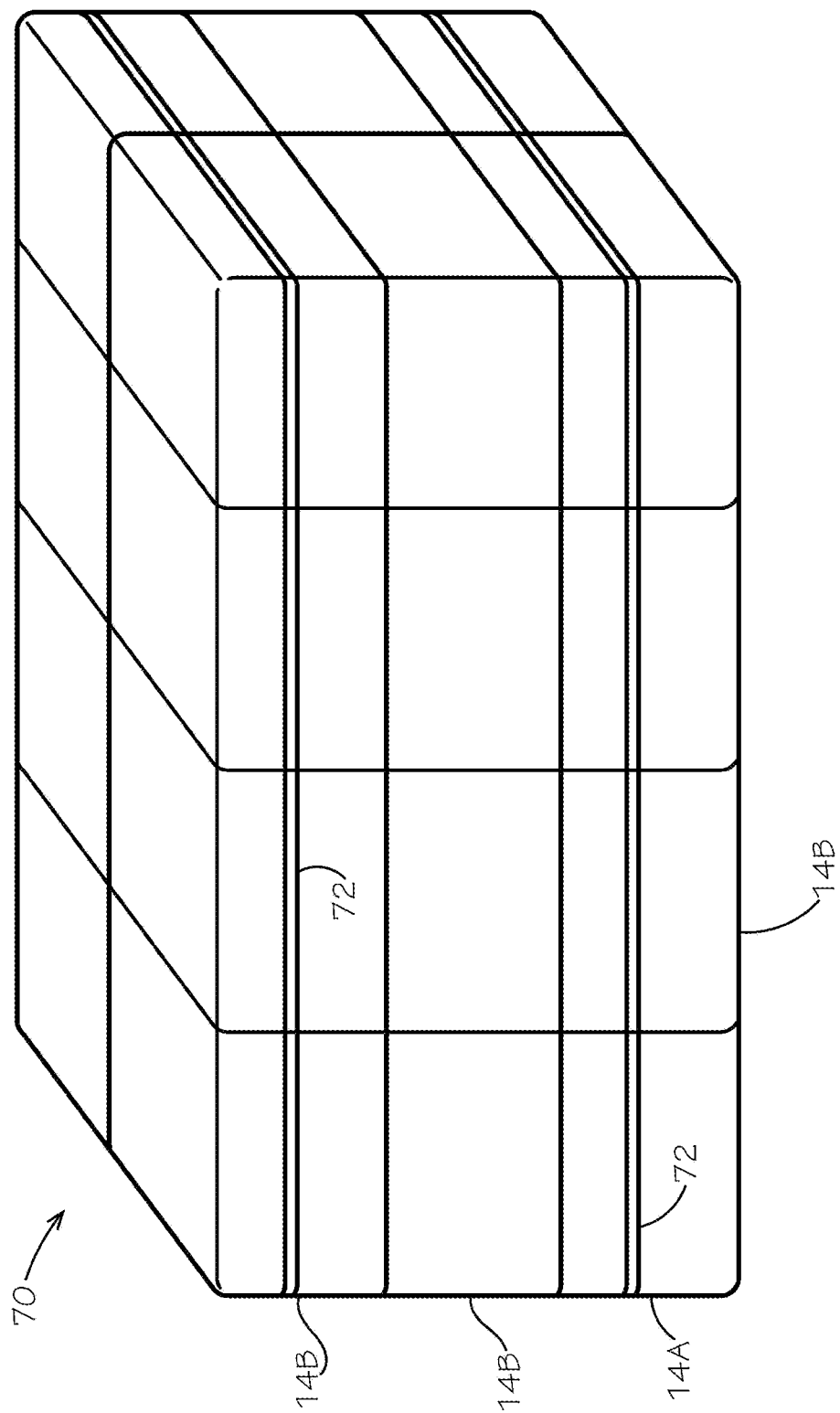
FIG. 4 is a flowchart of a method of grouping bales into a transportation group and determining the weight of the transportation group.

Turning now to FIG. 3, as the baler 10 collects and bales crop material 12 throughout a field 68, a plurality of bales 14 are formed. In accordance with the invention, a desired number of bales 14 in the field are combined into an aggregate 70 of bales 14. The baler 10 is configured to supply at least one tagged bale, designated 14A, with an identification tag 62 while other non-tagged bales in the aggregate 70, designated 14B, are not supplied with an identification tag 62 such that a given number of identification tags 62 are included in the aggregate 70. Desirably, the baler 10 supplies one identification tag 62 per aggregate 70, but two or more identification tags 62 per aggregate 70 may be supplied to ensure device life. In one embodiment, the identification tag 62 are spaced within the binding material 34 so that the binding material 34 provides the tagged bale 14A with an identification tag 62 and does not supply identification tags 62 to the remaining non-tagged bales 14B in the preferred aggregate 70 size. For example, if each bale 14 requires 4 feet of binding material 34 from the supply roll 38 per bale 14A or 14B and it is desired to have 20 bales 14A, 14B in the aggregate 70 for handling, then the supply roll 38 would incorporate a spacing of identification tags 62 on the binding material 34 of one identification tag 62 in about every 80 ft or less of binding material to provide one or more identification tags 62 per aggregate 70. Each aggregate 70 of multiple bales 14A, and 14B may then be bundled together either with twine, banding, or similar binding material 72 as shown in FIG. 4.

The bales 14A, 14B would geo located via GPS as they are created by the baler 10 and displayed to the operator collecting and stacking the bales 14A, 14B to identify which bales 14A, 14B are assigned to the aggregate 70. Aggregates 70 may be identified by color, a number, or other simple identifier. In another instance, one baler 10 is equipped with binding material 34 that supplies Identification tags 62 while other balers 10 within the field are not supplied with binding material 34 with identification tags 62, but just a binding material without identification tags, thereby creating a mix of RFID-equipped tagged bales 14A and non-RFID-equipped non-tagged bales 14B. Desirably all bales 14A, 14B are geo located via GPS as they are created through any known means. Aggregates 70 are created on a display by assigning the non-tagged bales 14B without identification tags 62 to either the nearest or most similar tagged bale 14A equipped with an identification tag 62. Bales 14A, 14B within the aggregate 70 may then be visually displayed with their locations to the operator collecting and stacking the bales 14A, 14B.

Figure 5:
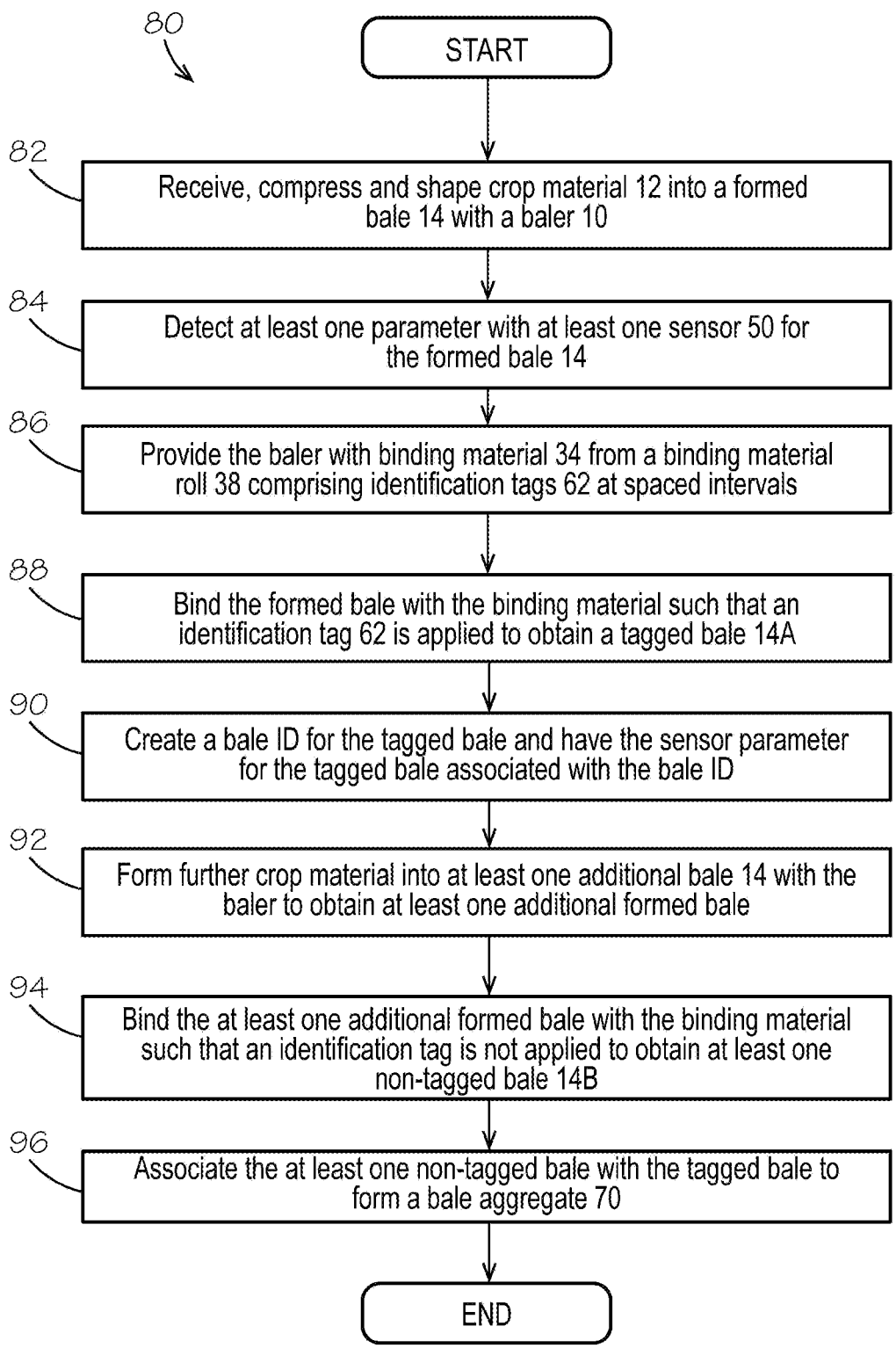
FIG. 5 shows a flowchart of a method of storing information corresponding to crop material formed into a bale during a baling process for an aggregation of bales. Corresponding reference characters indicate corresponding parts throughout the views of the drawings.

Turning now to FIG. 5, a method of storing information corresponding to crop material formed into a bale 14 during a baling process for an aggregation of bales is shown at 80. During a first step 82, crop material is formed into a bale 14 with the baler 10 to obtain a formed bale. At least one parameter of the crop material 12 or formed bale 14 is detected with at least one crop sensor and/or bale sensor 50 for the formed bale 14 at step 84. The baler 10 is provided with binding material 34 from the binding material roll 38 comprising identification tags 62 at spaced intervals along the binding material, at step 86. The formed bale 14 is bound with the binding material 34 using the knotter system 32 such that an identification tag 62 is applied to the bale 14 to obtain a tagged bale 14A at step 88. A bale ID is created for the tagged bale 14A and the sensor parameter for the tagged bale 14A is associated with the bale ID at step 90. Further crop material is formed into at least one additional bale 14 with the baler 10 to obtain at least one additional formed bale at step 92. The at least one additional formed bale 14 is bound with the binding material 34 such that an identification tag 62 is not applied to the at least one additional formed bale 14 to obtain at least one non-tagged bale 14B at step 94. The at least one non-tagged bale is associated with the tagged bale 14A and the tagged and non-tagged bales 14A, 14B are formed into a bale aggregate 70 at step 96.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

At least the following is claimed:

1. A method of storing information corresponding to crop material formed into a bale during a baling process for an aggregation of bales comprising:

receive, compress and shape crop material into a formed bale with a baler;

detect at least one parameter with at least one sensor for the formed bale;

provide the baler with binding material from a binding material roll comprising identification tags at spaced intervals;

bind the formed bale with the binding material such that an identification tag is applied to obtain a tagged bale;

create a bale ID for the tagged bale and have the sensor parameter for the tagged bale associated with the bale ID;

form further crop material into at least one additional bale with the baler to obtain at least one additional formed bale;

bind the at least one additional formed bale with the binding material such that an identification tag is not applied to obtain at least one non-tagged bale; and associate the at least one non-tagged bale with the tagged bale to form a bale aggregate.

* * * * *